United States Patent Office.

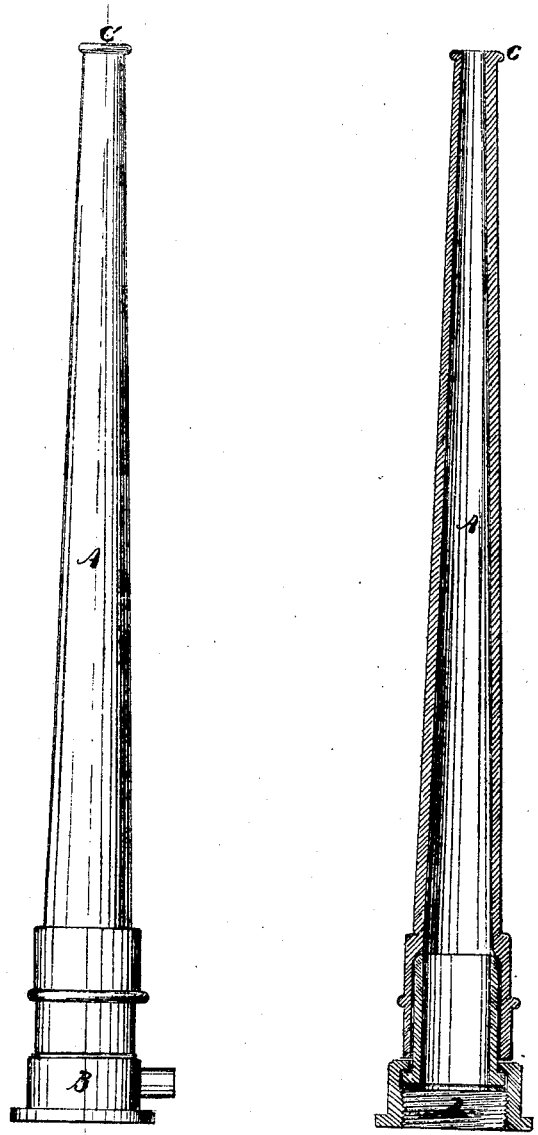

EDWARD L. PERRY, OF NEW YORK, N. Y., ASSIGNOR TO COMBINATION RUBBER COMPANY, OF SAME PLACE.

Letters Patent No. 114,337, dated May 2, 1871.

IMPROVEMENT IN RUBBER PLAY-PIPES FOR HOSE.

The Schedule referred to in these Letters Patent and making part of the same.

*To all whom it may concern:*

Be it known that I, EDWARD L. PERRY, of the city, county, and State of New York, have invented a new and improved Rubber Play-Pipe; and I do hereby declare that the following is a full, clear, and exact description of the same, reference being had to the accompanying drawing and to the letters of reference marked thereon making a part of this specification.

The object of this invention is to construct a flexible play-pipe or nozzle for hose in such manner that the same shall be durable, light, and inexpensive, and to this end I construct said play-pipe or nozzle of molded India rubber, in the manner hereinafter described.

In the accompanying drawing—

Figure 1 represents a side view of my invention, and

Figure 2 a section of same.

Similar letters of reference indicate corresponding parts in the several figures.

A represents a play-pipe or nozzle which is made of rubber or its compounds in the following manner:

A conical mandrel of the desired shape and size, with a metallic coupling, B, fitted loosely to the end thereof, is first inclosed in a sheet of pure unvulcanized rubber or its compounds, which also incloses the shank of said coupling, the edges of the rubber lapping the one over the other, thus forming a foundation. This foundation is next infolded in a strip of cotton cloth, or other suitable material, cut to the proper size, and saturated with pure India rubber or its compounds, making one ply, and this ply is again infolded in one or more pieces of cotton cloth, as before described, the lap in each piece breaking joint with the piece that was applied immediately before it, and so on.

The pipe may be built up with as many plies as is thought best until the requisite strength and body is obtained, the whole finally being covered with an outer tube of pure rubber or its compounds.

A rubber terminal, C, is next passed over the lesser end of the pipe thus formed, and it is then placed into a metallic mold of suitable construction, so that when the several parts of the mold are brought tightly together the pipe will be properly shaped or molded. The mold inclosing the pipe just described is next subjected to heat in the ordinary way, and the pipe is thus vulcanized. The mandrel being then withdrawn the process is completed.

Among other advantages of my play-pipe or nozzle over others is that, aside from its cheapness and flexibility, it cannot be dented or bruised by a fall or other casualty, and must, therefore, always retain its given shape, and, by providing it with the terminal at its lesser end, composed of pure rubber or its compounds, a stream of greater or lesser volume may be had, from the finest spray to the full capacity of the nozzle, by simply compressing the two sides of the terminal together with the thumb and fingers. Or, if desired in this way, the exit of the water may be stopped.

It is hardly necessary to mention that the play-pipe or nozzle thus formed is screwed to the hose by means of the coupling B, or any other suitable device.

In the above invention I do not confine myself to the use of a soft material, but can, by changing the grade of the material used, produce a soft and flexible, semi-hard, or hard and rigid play-pipe. Nor do I confine myself to the use of the metallic coupling B, which can be substituted by a semi-hard or hard compound of suitable shape, made either separate or as a part of the play-pipe above referred to.

Having thus described my invention,

What I claim as new, and desire to secure by Letters Patent, is—

A molded rubber play-pipe or nozzle for hose, as and for the purpose hereinbefore described.

EDWARD L. PERRY.

Witnesses:
RUFUS HOYT,
H. L. WATTENBERG.